United States Patent
Eum (10) Patent No.: US 10,708,994 B2
(45) Date of Patent: Jul. 7, 2020

(54) SYSTEM AND METHOD FOR SHAPING INPUT CURRENT IN LIGHT EMITTING DIODE (LED) SYSTEM

(71) Applicant: SEMICONDUCTOR COMPONENTS INDUSTRIES, LLC, Phoenix, AZ (US)

(72) Inventor: Hyunchul Eum, Gwangmyeong (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/520,138

(22) Filed: Jul. 23, 2019

(65) Prior Publication Data

US 2019/0350056 A1 Nov. 14, 2019

Related U.S. Application Data

(63) Continuation of application No. 15/782,054, filed on Oct. 12, 2017, now Pat. No. 10,405,382.

(60) Provisional application No. 62/521,838, filed on Jun. 19, 2017.

(51) Int. Cl.
*H05B 45/10* (2020.01)
*H05B 45/37* (2020.01)
*H05B 45/395* (2020.01)

(52) U.S. Cl.
CPC ............. *H05B 45/37* (2020.01); *H05B 45/10* (2020.01); *H05B 45/395* (2020.01)

(58) Field of Classification Search
CPC .... H05B 37/02; H05B 33/08; H05B 33/0812; H05B 33/0815; H05B 33/0845; H05B 33/0854; H05B 45/00; H05B 45/10; H05B 45/37; H05B 45/395; H05B 47/00; H05B 47/10
See application file for complete search history.

(56) References Cited

U.S. PATENT DOCUMENTS

| 2012/0068617 A1* | 3/2012 | Matsuda | H05B 45/37 |
| | | | 315/240 |
| 2012/0139438 A1* | 6/2012 | Soleno | H05B 33/0815 |
| | | | 315/291 |
| 2015/0366028 A1 | 12/2015 | Jao et al. | |

OTHER PUBLICATIONS

Texas Instruments, TPS92410 Switch-Controlled, Direct Drive, Liner Controller for Offline LED drivers (May 2014).
Texas Instruments, TPS92411x Floating Switch for Offline AC Liner Direct Drive of LEDs with Low Ripple Current (Jul. 2014).

* cited by examiner

*Primary Examiner* — Jimmy T Vu
(74) *Attorney, Agent, or Firm* — AMPACC Law Group, PLLC (57) ABSTRACT

A circuit for controlling a lighting system includes a phase angle detector detecting a phase angle of a rectified input signal and generating a phase angle signal indicative of the phase angle, and a current shape controller determining a current shaping signal using the detected phase angle and adjusting the rectified input signal in response to the current shaping signal. The current shape controller varies a limiting value of the rectified input signal with the phase angle.

20 Claims, 5 Drawing Sheets

SYSTEM AND METHOD FOR SHAPING INPUT CURRENT IN LIGHT EMITTING DIODE (LED) SYSTEM

CROSS-REFERENCE TO RELATED APPLICATION

This application is a Continuation of U.S. patent application Ser. No. 15/782,054, filed on Oct. 12, 2017, which claims the benefit of U.S. Provisional Application No. 62/521,838 filed on Jun. 19, 2017, the entire contents of which are incorporated by reference herein in its entirety.

FIELD OF THE DISCLOSURE

The present disclosure relates to integrated circuit devices, and more particularly to a Direct Alternating Current Drive (DACD) light emitting diode (LED) system.

BACKGROUND

Light emitting diodes (LED) have been popular in electronic device applications, for instance, indicator applications, displays of laboratory instruments, and illumination applications. An LED string, which includes a plurality of LEDs connected to each other, utilizes a current flowing thorough the LEDs for operation.

When a Direct Alternating Current Drive (DACD) LED system including the LED string is being supplied with a continuous AC voltage, a Power Factor (PF) of the DACD LED system may be maintained near one (i.e., 1) by having an instantaneous current through the DACD LED system be proportional to an instantaneous level of the continuous AC voltage.

When the DACD LED system operates in a phase cut dimming mode, such as when the DACD LED system is supplied with a discontinuous AC voltage by a triac-based dimmer, a waveform of a current flowing through the LEDs may transition abruptly from being proportional to the instantaneous level of the continuous AC voltage to having a fixed value when the current is not zero. Such an abrupt change in the waveform of the current flowing through the LEDs may produce a flickering of the light emitted from the LEDs.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

DETAILED DESCRIPTION

Embodiments relate to a circuit and a method for controlling a power converter.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

Figure 1:
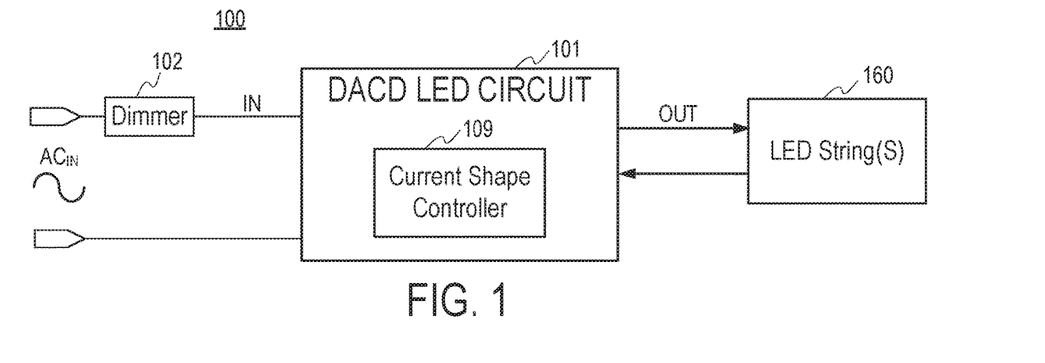
FIG. 1 illustrates a block diagram of a lighting circuit according to an embodiment.

FIG. 1 illustrates a lighting circuit (or a lighting system) 100 according to an embodiment. The lighting circuit 100 receives an input signal (e.g., an input voltage) IN and provides an output signal OUT to an LED string 160.

The lighting circuit 100 in FIG. 1 includes a current shaping controller 110. The current shape controller 109 in FIG. 1 may be integrated in a semiconductor chip, and the semiconductor chip may be packaged by itself or together with one or more other semiconductor chips.

The LED string 160 includes one or more LEDs connected to each other to form one or more LED strings, and the output signal OUT is used to supply power to the LEDs.

Figure 2:
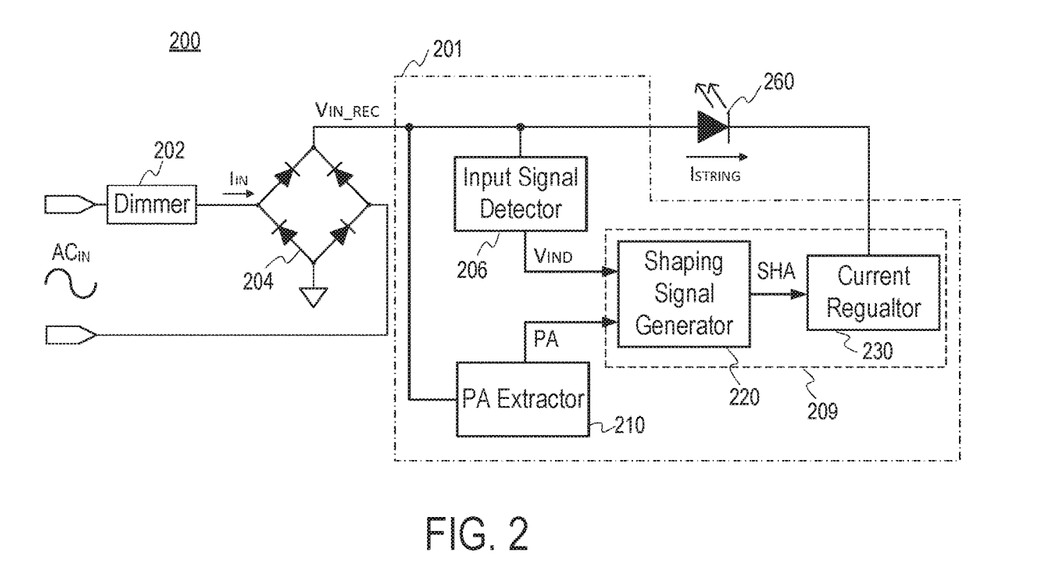
FIG. 2 illustrates an LED system suitable for use as the lighting circuit of FIG. 1 according to an embodiment.

FIG. 2 illustrates an LED system 200 suitable for use as the lighting circuit 100 of FIG. 1 according to an embodiment. The LED system 200 in FIG. 2 includes an LED driver 201, a dimmer 202, a rectifier 204, and an LED string 260. In an embodiment, the LED system 200 operates based on a Direct AC Drive (DACD) LED scheme.

The LED driver 201 in FIG. 2 includes an input signal detector 206, a phase angle (PA) extractor (or a PA detector) 210, and a current shape controller 209. The current shape controller 209 in FIG. 2 includes a shaping signal generator 220 and a current regulator 230. The LED driver 201 receives a rectified input voltage $V_{IN\_REC}$ from the rectifier 204 (e.g., a bridge rectifier) and the dimmer 202.

A power supply (not shown) provides an AC input signal $AC_{IN}$ to the dimmer 202. In an embodiment, the dimmer 202 is a triode-for-alternating-current (TRIAC) based dimmer and generates an input signal (e.g., an input current) $I_{IN}$, which corresponds to a phase-chopped version of the AC input signal $AC_{IN}$.

When the dimmer 202 in FIG. 2 is operating to provide the input signal $I_{IN}$ to the rectifier 204 in FIG. 2, the rectifier 204 rectifies the input signal $I_{IN}$, which corresponds to the phase-chopped version of the AC input signal $AC_{IN}$, to generate a rectified input signal (e.g., a rectified input voltage) $V_{IN\_REC}$. When the dimmer 202 is not operating as a dimmer (that is, when the dimmer 202 provides the AC input signal $AC_{IN}$ to the rectifier without alteration or interruption), the rectifier 204 receives the AC input signal $AC_{IN}$ having a substantially sinusoidal waveform and rectifies the AC input signal $AC_{IN}$ to generate the rectified input signal $V_{IN\_REC}$.

The input signal detector 206 in FIG. 2 receives the rectified input voltage $V_{IN\_REC}$ and generates a scaled input signal (e.g., a scaled input voltage) $V_{IND}$, which is a scaled version of the rectified input voltage $V_{IN\_REC}$. In an embodiment, the input signal detector 206 is a voltage divider that includes a pair of resistors (not shown) connected in series, and generates the scaled input voltage $V_{IND}$ at a node between the pair of resistors. In another embodiment, the input signal detector 206 includes a resistor (not shown) having a first end receiving the rectified input voltage $V_{IN\_REC}$ and a second end connected to a current sense circuit (not shown). The current sense circuit generates an output signal indicating a magnitude of a current flowing through the resistor. The output signal from the current sense circuit corresponds to the scaled version $V_{IND}$ of the rectified input voltage $V_{IN\_REC}$.

The PA extractor (or a PA detector) 210 in FIG. 2 receives the rectified input voltage $V_{IN\_REC}$, and generates a phase angle signal PA indicating a phase angle of the rectified input voltage $V_{IN\_REC}$. When the dimmer 202 in FIG. 2 is a TRIAC dimmer, the phase angle of the rectified input voltage $V_{IN\_REC}$ corresponds to a conduction angle of the TRIAC dimmer 202. In an embodiment, the phase angle signal (e.g., a phase angle voltage) PA is a voltage having a level proportional to the phase angle of the rectified input voltage $V_{IN\_REC}$. For example, a level of the phase angle voltage PA is 0V when the rectified input voltage $V_{IN\_REC}$ has a phase angle of 0°, and the level of the phase angle voltage PA is 4V when the rectified input voltage $V_{IN\_REC}$ has a phase angle of 180°.

The shaping signal generator 220 in FIG. 2 receives the scaled input signal $V_{IND}$ and the phase angle signal PA, generates a shaping offset signal in response to the phase angle signal PA, and generates a current shaping signal SHA in response to the scaled input signal $V_{IND}$ and the shaping offset signal. For example, the shaping offset signal has a value obtained by subtracting the value of the phase angle signal PA from a maximum value of the phase angle signal PA. In an embodiment, the current shaping signal SHA has a value equal to a sum of a value of the scaled input signal $V_{IND}$ and the value of the shaping offset signal. In another embodiment, the current shaping signal SHA has a value obtained by multiplying the value of the scaled input signal $V_{IND}$ and the value of the shaping offset signal.

The current regulator 230 in FIG. 2 receives the current shaping signal (e.g., a current shaping voltage) SHA, and regulates a string current $I_{STRING}$ flowing through the LED string 260 in response to the current shaping signal SHA. In an embodiment, the current regulator 230 causes the string current $I_{STRING}$ to have a magnitude obtained by dividing a level of the current shaping voltage SHA by a resistance value of a sense resistor.

The LED string 260 in FIG. 2 includes a plurality of LEDs coupled to each other. Although the LED system 200 in FIG. 2 includes a single LED string 260, embodiments of the present disclosure are not limited thereto. For example, the LED system 200 may include a plurality of LED strings as will be described below with reference to FIG. 7.

Figure 3A:
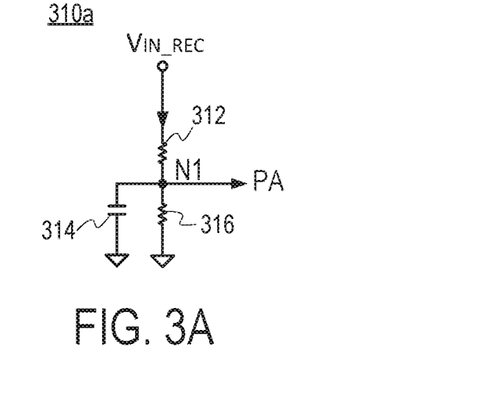
FIG. 3A illustrates a phase angle (PA) extractor suitable for use as an PA extractor of FIG. 2 according to a first embodiment.

FIG. 3A illustrates a PA extractor (or a PA detector) 310a suitable for use as the PA extractor 210 of FIG. 2 according to a first embodiment. The PA extractor 310a in FIG. 3A includes first and second resistors 312 and 316 and a capacitor 314.

The first resistor 312 in FIG. 3A has a first end receiving a rectified input voltage $V_{IN\_REC}$ and a second end connected to an output node N1. The second resistors 316 in FIG. 3A has a first end connected to the output node N1 and a second end connected to a ground. The capacitor 314 in FIG. 3A has a first end connected to the output node N1 and a second end connected to the ground.

Figure 3B:
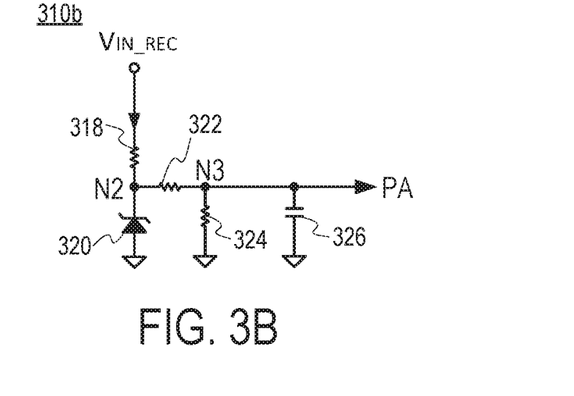
FIG. 3B illustrates a PA extractor suitable for use as the PA extractor of FIG. 2 according to a second embodiment.

FIG. 3B illustrates a PA extractor 310b suitable for use as the PA extractor 210 of FIG. 2 according to a second embodiment. The PA extractor 310b in FIG. 3B includes first, second, and third resistors 318, 322, and 324, a Zener diode 320, and a capacitor 326.

The first resistor 318 in FIG. 3B has a first end receiving a rectified input voltage $V_{IN\_REC}$ and a second end connected to a first node N2. The second resistor 322 in FIG. 3B has a first end connected to the first node N2 and has a second end connected to a second node N3. The third resistor 324 in FIG. 3B has a first end connected to the second node N3 and a second end connected to a ground. The Zener diode 320 in FIG. 3B has a cathode connected to the first node N2 and an anode connected to the ground. The capacitor 326 in FIG. 3B has a first end connected to the second node N3 and a second end connected to the ground. During a phase angle of the rectified input voltage $V_{IN\_REC}$ corresponding to an on-time duration of the dimmer 202 of FIG. 2, the rectified input voltage $V_{IN\_REC}$ has a level higher than a Zener voltage of the Zener diode 320, and the Zener diode 320 maintains a level of a voltage at the first node N2 at the Zener voltage. During a phase-cut of the rectified input voltage $V_{IN\_REC}$ corresponding to an off-time duration of the dimmer 202 of FIG. 2, the rectified input voltage $V_{IN\_REC}$ has a level substantially equal to 0V, and the level of the voltage at the first node N2 is substantially equal to 0V. The second resistor 322, the third resistor 324, and the capacitor 326 function as a filter. As a result, the PA extractor 310b in FIG. 3B generates a phase angle signal PA, which is a DC voltage having a constant level that is proportional to a duty cycle of the dimmer 202.

Figure 3C:
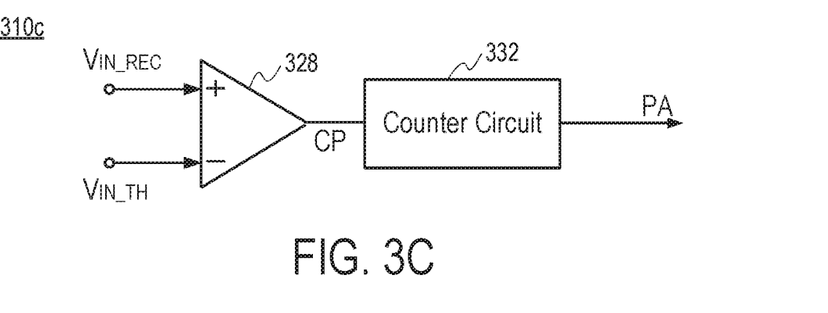
FIG. 3C illustrates a PA extractor suitable for use as the PA extractor of FIG. 2 according to a third embodiment.

FIG. 3C illustrates a PA extractor 310c suitable for use as the PA extractor 210 of FIG. 2 according to a third embodiment. The PA extractor 310c in FIG. 3C includes a comparator 328 and a counter circuit 332.

The comparator 328 in FIG. 3C has a non-inverting input receiving a rectified input voltage $V_{IN\_REC}$ and an inverting input receiving a threshold voltage $V_{IN\_TH}$. The comparator 328 compares a level of the rectified input voltage $V_{IN\_REC}$ and a level (e.g., equal to or higher than 0V) of threshold voltage $V_{IN\_TH}$, and generates a comparison signal CP. In an embodiment, a duty cycle of the comparison signal CP corresponds to a phase angle of the rectified input voltage $V_{IN\_REC}$.

The counter circuit 332 in FIG. 3C receives the comparison signal CP and generates a phase angle signal PA in response to the comparison signal CP. In an embodiment, the counter circuit 332 includes a digital counter (not shown) that, for example, counts at a predetermined rate when the comparison signal CP is high and is reset to zero when the comparison signal CP is low, and a digital-to-analog converter (not shown). The digital counter generates a digital signal indicating the time interval corresponding to the phase angle of the rectified input voltage $V_{IN\_REC}$, and the digital-to-analog converter converts the digital signal into the analog phase angle signal PA. In an embodiment, the digital-to-analog converter includes a latch on its input, a sample-and-hold circuit on its output, or both to maintain a value of the analog phase angle signal PA while the digital counter is counting, is reset, or both.

Figure 4A:
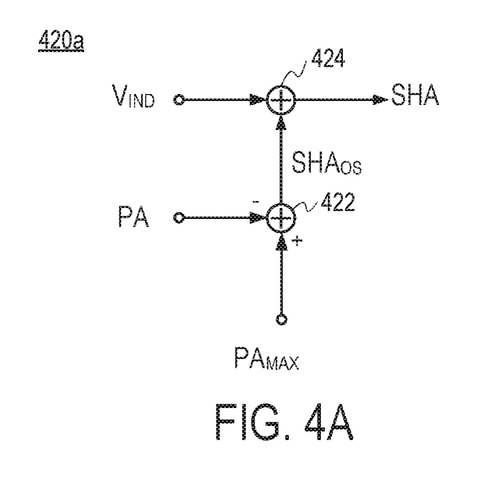
FIG. 4A illustrates a shaping signal generator suitable for use as a shaping signal generator of FIG. 2 according to an embodiment.

FIG. 4A illustrates a shaping signal generator 420a suitable for use as the shaping signal generator 220 of FIG. 2 according to an embodiment. The shaping signal generator 420a in FIG. 4 includes a subtractor 422 and an adder 424.

The subtractor 422 in FIG. 4A subtracts a value of a phase angle signal PA from a value of a maximum phase angle signal (e.g., a maximum phase angle voltage) $PA_{MAX}$, and generates a shaping offset signal $SHA_{OS}$ indicating the subtracted value. In an embodiment, the maximum phase angle signal $PA_{MAX}$ is a DC voltage having a level, which corresponds to a phase angle in a range from 135° to 180°.

The adder 424 in FIG. 4A adds a value of a scaled input signal $V_{IND}$ and the value of the shaping offset signal $SHA_{OS}$, and generates a current shaping signal SHA indicating the added value. When the value of the phase angle signal PA is less than the value of the maximum phase angle signal $PA_{MAX}$, the value of the shaping offset signal $SHA_{OS}$ has a positive value, resulting in an increase of the value of the current shaping signal SHA. When the value of the current shaping signal SHA increases, a magnitude of an input current (e.g., the input current $I_{IN}$ in FIG. 2) increases, as will be described below in more detail with reference to FIG. 6.

Figure 4B:
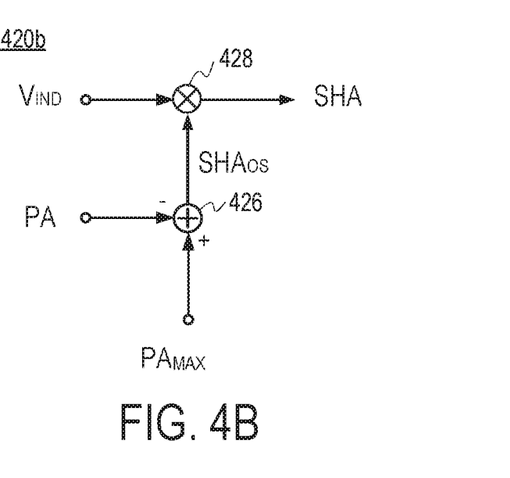
FIG. 4B illustrates a shaping signal generator suitable for use as the shaping signal generator of FIG. 2 according to another embodiment.

FIG. 4B illustrates a shaping signal generator 420b suitable for use as the shaping signal generator 220 of FIG. 2 according to another embodiment. The shaping signal generator 420b in FIG. 4B includes a subtractor 426 and a multiplier 428.

The subtractor 426 in FIG. 4B subtracts a value of a phase angle signal PA from a value of a maximum phase angle signal $PA_{MAX}$, and generates a shaping offset signal $SHA_{OS}$ indicating the subtracted value. The multiplier 428 in FIG. 4B multiplies a value of a scaled input signal $V_{IND}$ and the value of the shaping offset signal $SHA_{OS}$, and generates a current shaping signal SHA indicating the multiplied value. When the value of the phase angle signal PA decreases, the value of the shaping offset signal $SHA_{OS}$ increases, resulting in an increase of the value of the current shaping signal SHA.

Figure 5A:
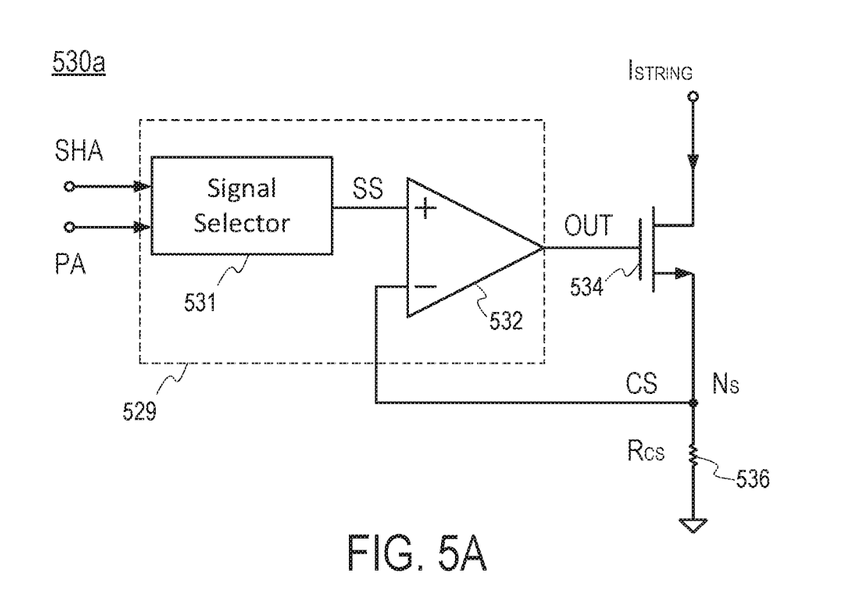
FIG. 5A illustrates a current regulator suitable for use as a current regulator of FIG. 2 according to an embodiment.

FIG. 5A illustrates a current regulator 530a suitable for use as the current regulator 230 of FIG. 2 according to an embodiment. The current regulator 530a in FIG. 5A includes a three-input amplifier 529, a switching device 534, and a sense resistor 536. The three-input amplifier 529 in FIG. 5A includes a signal selector 531 and a two-input amplifier 532.

In the embodiment shown in FIG. 5A, the signal selector 531 receives a current shaping signal SHA and a phase angle signal PA, compares a value of the current shaping signal SHA and a value of the phase angle signal PA, selects one of the receive signals SHA and PA having a smaller value, and provides the selected signal SS to the two-input amplifier 532. The signal selector 531 functions as a current limiting circuit, as will be described below in more detail with reference to FIG. 6. In an embodiment, the three-input amplifier 529 has two positive input terminals (not shown) receiving the current shaping signal SHA and the phase angle signal PA and one negative input terminal (not shown) receiving the sense signal CS.

In another embodiment, the signal selector 531 receives a reference voltage (not shown) having a substantially constant level, rather than the phase angle signal PA. For example, when the phase angle single PA is replaced with a constant DC voltage.

The amplifier 532 in FIG. 5A has a non-inverting input receiving the selected signal (or a selected voltage) SS and an inverting input receiving a sense signal (e.g., a sense voltage) CS, and provides an output signal OUT to a control terminal of the switching device 534 in FIG. 5A. In an embodiment, the switching device 534 is an n-channel Metal-Oxide-Semiconductor Field Effect Transistor (nMOSFET) and has a gate receiving the output signal OUT and a source connected to the sensing node Ns. The amplifier 532 and the switching device 534 operate to make a level of the sense voltage CS substantially equal to a level of the selected voltage SS. As a result, a magnitude of a string current $I_{STRING}$ (e.g., the string current $I_{STRING}$ in FIG. 2) can be represented by Equation 1:

$$I_{STRING} = \frac{SS}{R_{CS}}. \quad \text{Equation 1}$$

In Equation 1, $R_{CS}$ is a resistance value of the sense resistor 536. Because the string current $I_{STRING}$ has substantially the same magnitude as a rectified version of an input current $I_{IN}$ (e.g., the input current $I_{IN}$ in FIG. 2), the current controller 530a changes a waveform of the input current $I_{IN}$ in response to the current shaping signal SHA and the phase angle signal PA.

Figure 5B:
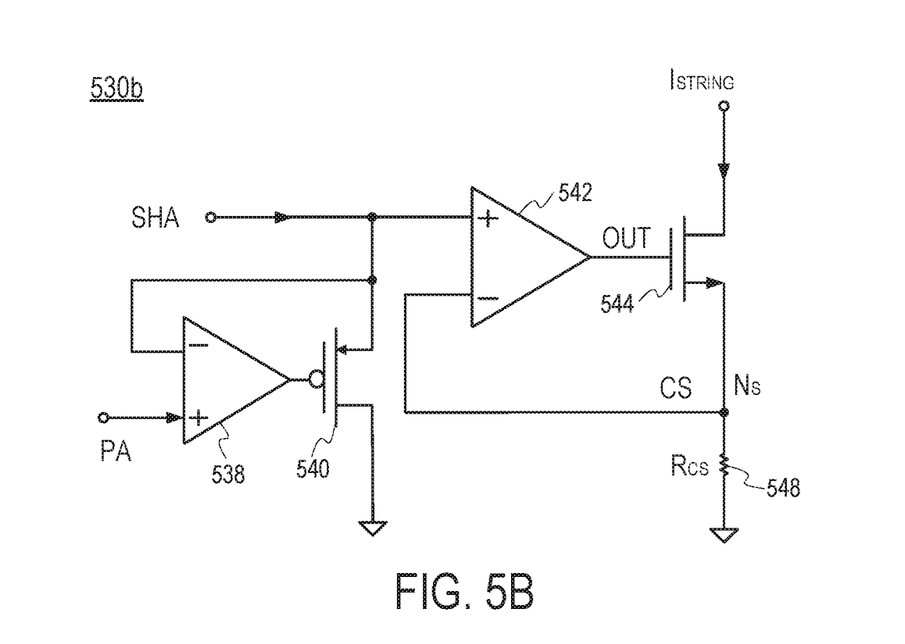
FIG. 5B illustrates a current regulator suitable for use as the current regulator of FIG. 2 according to another embodiment.

FIG. 5B illustrates a current regulator 530b suitable for use as the current regulator 230 of FIG. 2 according to another embodiment. The current regulator 530b in FIG. 5B includes a first amplifier 538, a first switching device 540, a second amplifier 542, a second switching device 544, and a sense resistor 548.

In the embodiment shown in FIG. 5B, the first amplifier 538 has an inverting input receiving a current shaping signal SHA and a non-inverting input receiving a phase angle signal PA. The first switching device 540 in FIG. 5B has a control terminal connected to an output of the first amplifier 538. For example, the first switching device 540 is a p-channel Metal-Oxide-Semiconductor Field Effect Transistor (pMOSFET), and has a source connected to the inverting input of the first amplifier 538 and a drain connected to a ground. The first amplifier 538 and the first switching device 540 operate to limit a value of the current shaping signal SHA to a value of the phase angle signal PA, and thus function as a current limiting circuit, as will be described in more detail below with reference to FIG. 6.

In another embodiment, the first amplifier 538 has the non-inverting input receiving a reference voltage (not shown) with a substantially constant level, rather than the phase angle signal PA. In this embodiment, the first amplifier 538 and the first switching device 540 operate to limit the value of the current shaping signal SHA to the constant level of the reference voltage.

The second amplifier 542 in FIG. 5B has a non-inverting input receiving the current shaping signal (e.g., a current shaping voltage) SHA and an inverting input receiving a sense signal (e.g., a sense voltage) CS, and provides an output signal OUT to a control terminal of the second switching device 544 in FIG. 5B. In an embodiment, the switching device 544 is an nMOSFET and has a source connected to a sensing node Ns. The second amplifier 542 and the second switching device 544 operate to make a level of the sense voltage CS substantially equal to a level of the current shaping voltage SHA.

Figure 6:
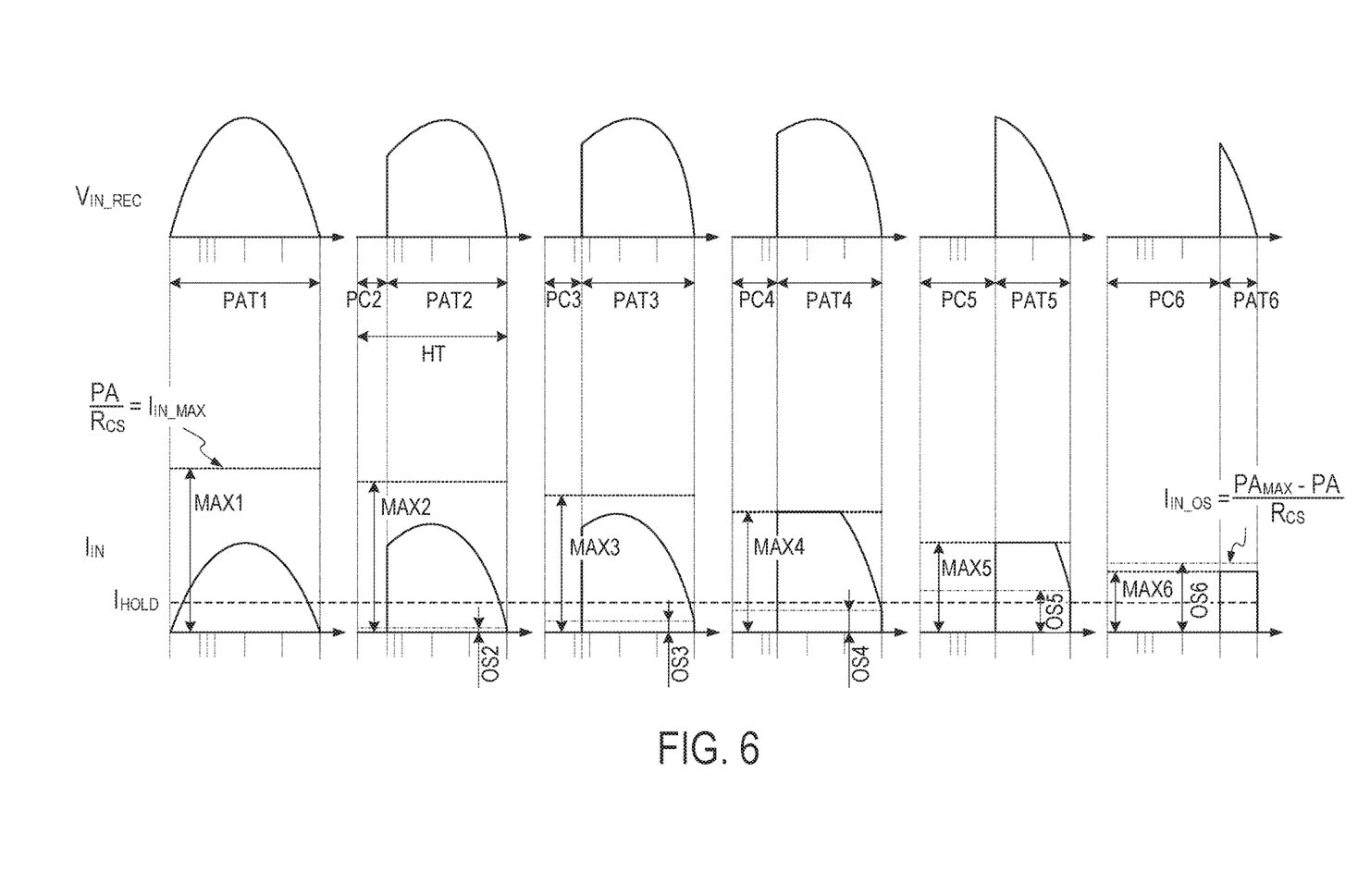
FIG. 6 illustrates an operation of a current shape controller (e.g. the current shape controller of FIG. 2) according to an embodiment.

FIG. 6 illustrates an operation of a current shape controller (e.g., the current shape controller 209 of FIG. 2) according to an embodiment. The figure shows example waveforms of a rectified input voltage $V_{IN\_REC}$ (e.g., the rectified input voltage $V_{IN\_REC}$ in FIG. 2) and an input current $I_{IN}$ (e.g., the input current $I_{IN}$ in FIG. 2) as a function of a phase angle of the rectified input voltage $V_{IN\_REC}$.

The figure further shows an input offset current (indicated by a plurality of dashed lines) $I_{IN\_OS}$ and a maximum input current (indicated by a plurality of solid lines) $I_{IN\_MAX}$. The magnitude of the input offset current $I_{IN\_OS}$ and the magnitude of the maximum input current $I_{IN\_MAX}$ can be represented by Equation 2 and Equation 3, respectively:

$$I_{IN\_OS} = \frac{(PA_{MAX} - PA)}{R_{CS}}; \text{ and} \qquad \text{Equation 2}$$

$$I_{IN\_MAX} = \frac{PA}{R_{CS}}. \qquad \text{Equation 3}$$

In Equations 2 and 3, $PA_{MAX}$ is a maximum phase angle voltage (e.g., the maximum phase angle voltage $PA_{MAX}$ in FIG. 4A), PA is a phase angle voltage (e.g., the phase angle voltage PA in FIG. 2), and $R_{CS}$ is a resistance value of a sense resistor (e.g., the sense resistor 536 in FIG. 5A).

When the rectified input voltage $V_{IN\_REC}$ has a first phase-cut (e.g., 0°) and a first phase angle PAT1 (e.g., 180°), each of the rectified input voltage $V_{IN\_REC}$ and the input current $I_{IN}$ has a substantially sinusoidal waveform. The input offset current $I_{IN}$ OS has a first offset magnitude that is substantially equal to zero. The maximum input current $I_{IN\_MAX}$ has a first maximum magnitude MAX1 obtained by dividing the maximum phase angle voltage $PA_{MAX}$ by the resistance value $R_{CS}$ of the sense resistor.

When the rectified input voltage $V_{IN\_REC}$ has a second phase-cut PC2 and a second phase angle PAT2, each of the rectified input voltage $V_{IN\_REC}$ and the input current $I_{IN}$ has a first phase-chopped waveform. The second phase-cut PC2 is equal to a difference between a half period HT and the second phase angle PAT2 of the rectified input voltage $V_{IN\_REC}$. Because the second phase angle PAT2 is less than the first phase angle PAT1, a second offset magnitude OS2 of the input offset current $I_{IN\_OS}$ is greater than the first offset magnitude (e.g., 0 A). As a result, a magnitude of the input current $I_{IN}$ in a time interval corresponding to the second phase angle PAT2 is increased by the second offset magnitude OS2 that is positive. In addition, because the second phase angle PAT2 is less than the first phase angle PAT1, has a second maximum magnitude MAX2 of the maximum input current $I_{IN\_MAX}$ is less than the first maximum magnitude MAX1.

When the rectified input voltage $V_{IN\_REC}$ has a third phase-cut PC3 and a third phase angle PAT3, each of the rectified input voltage $V_{IN\_REC}$ and the input current $I_{IN}$ has a second phase-chopped waveform. Because the third phase angle PAT3 is less than the second phase angle PAT2, a third offset magnitude OS3 of the input offset current $I_{IN\_OS}$ is greater than the second offset magnitude OS2. As a result, a magnitude of the input current $I_{IN}$ in a time interval corresponding to the third phase angle PAT3 is increased by the third offset magnitude OS3. In addition, because the third phase angle PAT3 is less than the second phase angle PAT2, a third maximum magnitude MAX3 of the maximum input current $I_{IN\_MAX}$ is less than the second maximum magnitude MAX2.

When the rectified input voltage $V_{IN\_REC}$ has a fourth phase-cut PC4 and a fourth phase angle PAT4, the rectified input voltage $V_{IN\_REC}$ has a third phase-chopped waveform and the input current $I_{IN}$ has a first limited phase-chopped waveform. Because the fourth phase angle PAT4 is less than the third phase angle PAT3, a fourth offset magnitude OS4 of the input offset current $I_{IN\_OS}$ is greater than the third offset magnitude OS3. As a result, a magnitude of the input current $I_{IN}$ in a time interval corresponding to the fourth phase angle PAT4 is increased by the fourth offset magnitude OS4. In addition, because the fourth phase angle PAT4 is less than the third phase angle PAT3, a fourth maximum magnitude MAX4 of the maximum input current $I_{IN\_MAX}$ is less than the third maximum magnitude MAX3. When the magnitude of the input current $I_{IN}$ exceeds the fourth maximum magnitude MAX4, a current regulator (e.g., the current regulator 530a in FIG. 5A) according to an embodiment of the present disclosure functions as a current limiting circuit, thereby limiting the magnitude of the input current $I_{IN}$ to the fourth maximum magnitude MAX4.

When the rectified input voltage $V_{IN\_REC}$ has a fifth phase-cut PC5 and a fifth phase angle PAT5, the rectified input voltage $V_{IN\_REC}$ has a fourth phase-chopped waveform and the input current $I_{IN}$ has a second limited phase-chopped waveform. Because the fifth phase angle PAT5 is less than the fourth phase angle PAT4, a fifth offset magnitude OS5 of the input offset current $I_{IN\_OS}$ is greater than the fourth offset magnitude OS4. As a result, a magnitude of the input current $I_{IN}$ in a time interval corresponding to the fifth phase angle PAT5 is increased by the fifth offset magnitude OS5. In addition, because the fifth phase angle PAT5 is less than the fourth phase angle PAT4, a fifth maximum magnitude MAX5 of the maximum input current $I_{IN\_MAX}$ is less than the fourth maximum magnitude MAX4. The current regulator limits the magnitude of the input current $I_{IN}$ to the fifth maximum magnitude MAX5.

When the rectified input voltage $V_{IN\_REC}$ has a sixth phase-cut PC6 and a sixth phase angle PAT6, the rectified input voltage $V_{IN\_REC}$ has a fifth phase-chopped waveform and the input current $I_{IN}$ has a rectangular waveform. Because the sixth phase angle PAT6 is less than the fifth phase angle PAT5, a sixth offset magnitude OS6 of the input offset current $I_{IN\_OS}$ is greater than the fifth offset magnitude OS5, and a sixth maximum magnitude MAX6 of the maximum input current $I_{IN\_MAX}$ is less than the fifth maximum magnitude MAX5. In addition, because the sixth maximum magnitude MAX6 of the maximum input current $I_{IN\_MAX}$ becomes less than the sixth offset magnitude OS6 of the input offset current $I_{IN\_OS}$, the current regulator limits the input current $I_{IN}$ to the sixth maximum magnitude MAX6. As a result, the input current $I_{IN}$ has the rectangular waveform with a substantially constant magnitude equal to the sixth maximum magnitude MAX6. The constant magnitude of the input current $I_{IN}$ is greater than a holding current of a dimmer (e.g., the TRIAC dimmer 202 in FIG. 2), ensuring stable TRIAC conduction of the dimmer.

As described above, a current shape controller (e.g., the current shape controller 205 in FIG. 2) according to an embodiment of the present disclosure increases the magnitude of the input current $I_{IN}$ and decreases the magnitude of the maximum input current $I_{IN\_MAX}$ when the phase angle is decreased. As a result, an LED system including the current shape controller according to an embodiment of the present disclosure causes the waveform of the input current $I_{IN}$ to transition in a relatively smooth manner when the LED system operates in a dimming mode. Accordingly, such an LED system including the current shape controller and a TRIAC dimmer according to an embodiment of the present disclosure may substantially prevent an occurrence of flickering and other undesirable behavior while ensuring a stable operation of the TRIAC dimmer.

Although the LED system 200 in FIG. 2 includes a single LED string 260, embodiments of the present disclosure are not limited thereto. For example, the LED system 200 may include a plurality of LED strings and a current regulator that controls the plurality of LED strings, as will be described below with reference to FIG. 7.

Figure 7:
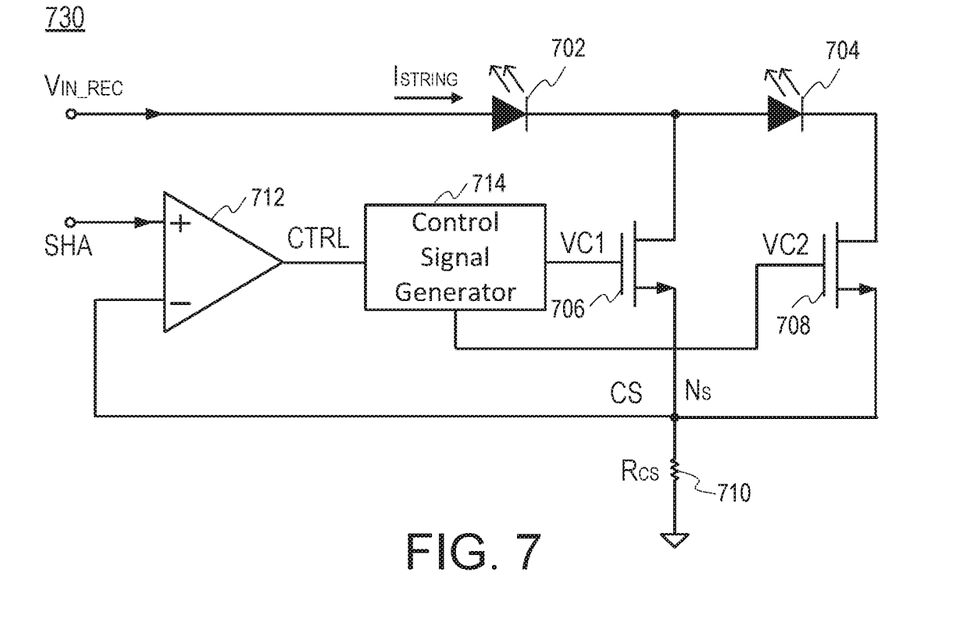
FIG. 7 illustrates a current regulator for use in an LED system according to an embodiment.

FIG. 7 illustrates a current regulator 730 according to an embodiment. The current regulator 730 in FIG. 7 includes an amplifier 712, a control signal generator 714, first and second switching devices 706 and 708, a sense resistor 710.

The amplifier 712 in FIG. 7 has a non-inverting input receiving a current shaping signal (e.g., a current shaping voltage) SHA and an inverting input receiving a sense signal (e.g., a sense voltage) CS, and provides a control signal CTRL to the control signal generator 714 in FIG. 7. The control signal generator 714 generates a first output signal VC1 and a second output signal VC2 in response to the control signal CTRL, and provides the first and second output signals VC1 and VC2 to respective control terminals of the first and second switching devices 706 and 708. In an embodiment, values of the first and second output signals are proportional to a value of the control signal CTRL, and the value of the second output signal VC2 is greater than the value of the first output signal VC1.

When a rectified input voltage $V_{IN\_REC}$ reaches a forward voltage of a first LED string 702, a string current $I_{STRING}$ flows through the first LED string 702 and the first switching device 706. The amplifier 712, the control signal generator 714, and the first switching device 706 operate to make a level of the sense voltage CS substantially equal to a level of the current shaping voltage SHA.

When the rectified input voltage $V_{IN\_REC}$ reaches a sum of the forward voltage of the first LED string 702 and a forward voltage of the second LED string 704, a magnitude of a first portion of the string current $I_{STRING}$ flowing through the first switching device 706 is smaller than a magnitude of a second portion of the string current $I_{STRING}$ flowing through the second switching device 708. The value of the second control signal VC2 becomes proximate to a threshold voltage of the second switching device 708, and thus the value of the first control signal VC1 becomes less than a threshold voltage of the first switching device 706, turning off the first switching device 706. The amplifier 712, the control signal generator 714, and the second switching device 708 operate to make the level of the sense voltage CS substantially equal to the level of the current shaping voltage SHA.

Although the first and second switching devices 706 and 708 in FIG. 7 are directly connected to the control signal generator 714, embodiments of the present disclosure are not limited thereto. In an embodiment, a third amplifier (not shown) may be disposed between the control signal generator 714 and the first switching device 706, such that the third amplifier has a non-inverting input that receives the first output signal VC1, an inverting input that receives the sense voltage CS, and an output connected to the control terminal of the first switching device 706. In such an embodiment, a fourth amplifier (not shown) may be further disposed between the control signal generator 714 and the second switching device 708, such that the fourth amplifier has a non-inverting input that receives the second output signal VC2, an inverting input that receives the sense voltage CS, and an output connected to the control terminal of the second switching device 708.

Figure 8:
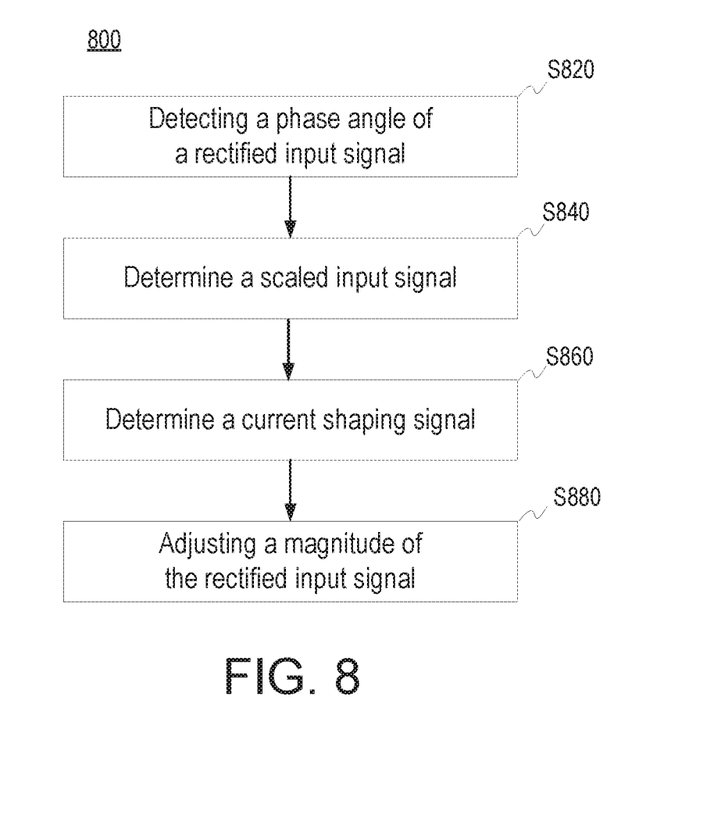
FIG. 8 illustrates a process performed by an LED driver (e.g., the LED driver in FIG. 2) according to an embodiment.

FIG. 8 illustrates a process 800 performed by an LED driver (e.g., the LED driver 201 in FIG. 2) according to an embodiment. The LED driver includes a PA detector (e.g., the PA detector 210 in FIG. 2), an input signal detector (e.g., the input signal detector 206 in FIG. 2), and a current shape controller (e.g. the current shape controller 209 in FIG. 2). The LED driver receives a rectified input signal, such as a rectified input signal produced by rectifying the output of a phase-cut dimmer (e.g. a TRIAC dimmer) connected to an AC input signal.

At S820, the PA detector detects a phase angle of the rectified input signal. In an embodiment, the PA detector generates a phase angle signal (e.g., the phase angle signal PA in FIG. 2), which is a voltage having a level proportional to the detected phase angle of the rectified input signal.

At S840, the input signal detector determines a scaled input signal (e.g., the scaled input signal $V_{IND}$ in FIG. 2) in response to the rectified input signal. In an embodiment, the input signal detector determines the scaled input signal in response to a voltage (e.g., the rectified input voltage $V_{IN\_REC}$ in FIG. 2) of the rectified input signal.

At S860, the current shape controller determines a current shaping signal (e.g., the current shaping signal SHA in FIG. 2) in response to the detected phase angle and the scaled input signal.

At S880, the current shape controller adjusts the rectified input signal in response to the detected phase angle. In an embodiment, the current shape controller increases a magnitude of a current of the rectified input signal (e.g., a magnitude of a rectified version of the input current $I_{IN}$ in FIG. 2) when the phase angle is decreased.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A circuit for controlling a lighting system, the circuit comprising:
   a phase angle detector configured to detect a phase angle of a rectified input signal and generate a phase angle signal indicative of the phase angle; and
   a current shape controller configured to determine a current shaping signal using the detected phase angle and to adjust the rectified input signal in response to the current shaping signal,
   wherein the current shape controller decreases a limiting value of the rectified input signal when the phase angle is decreased.

2. The circuit of claim 1, wherein the phase angle detector includes:
   a first resistor having a first end that receives a voltage of the rectified input signal and a second end;
   a second resistor having a first end coupled to the second end of the first resistor and a second end coupled to a ground; and
   a capacitor having a first end coupled to the first end of the second resistor and a second end coupled to the ground.

3. The circuit of claim 2, wherein the phase angle detector further includes:

a third resistor coupled between the second end of the first resistor and the first end of the second resistor; and a diode having a cathode coupled to the second end of the first resistor and an anode coupled the ground.

4. The circuit of claim 3, wherein the diode is a Zener diode.

5. The circuit of claim 1, wherein the phase angle detector generates the phase angle signal having a value that is proportional to the phase angle of the rectified input signal.

6. The circuit of claim 1, wherein the current shape controller varies an offset value of the rectified input signal with the phase angle, the phase angle being a difference between a half period of the rectified input signal and a phase-cut of the rectified input signal.

7. The circuit of claim 6, wherein the current shape controller increases the offset value of the rectified input signal when the phase angle is decreased.

8. The circuit of claim 1, further comprising an input signal detector configured to generate a scaled input signal in response to a voltage of the rectified input signal.

9. The circuit of claim 8, wherein the input signal detector includes:
a resistor having a first end receiving a voltage of the rectified input signal and a second end; and
a current sense circuit coupled to the second end of the resistor and generating the scaled input signal indicative of a magnitude of a current flowing through the resistor.

10. The circuit of claim 8, wherein the input signal detector determines the scaled input signal by dividing the voltage of the rectified input signal, and
wherein the current shape controller includes a shaping signal generator determining the current shaping signal in response to the scaled input signal and the phase angle signal.

11. The circuit of claim 1, wherein the current shape controller includes a current regulator limiting a current of the rectified input signal to the limiting value.

12. The circuit of claim 11, wherein the current regulator includes:
a signal selector comparing a value of the current shaping signal and a value of the phase angle signal and selecting one of the current shaping signal and the phase angle signal that has a smaller value to generate a selected signal;
an amplifier amplifying a difference between a value of the selected signal and a value of a sense signal, the sense signal indicating the magnitude of the current of the rectified input signal, the sense signal being output from a sensing node; and
a switching device having a gate coupled to an output of the amplifier and a source coupled to the sensing node.

13. The circuit of claim 11, wherein the current regulator includes:
a first amplifier amplifying a difference between a value of the current shaping signal and a value of the phase angle signal;

a first switching device having a gate coupled to an output of the first amplifier and a source receiving the current shaping signal;
a second amplifier amplifying a difference between the value of the current shaping signal and a value of a sense signal, the sense signal being output from a sensing node; and
a second switching device having a gate coupled to an output of the second amplifier and a source coupled to the sensing node.

14. The circuit of claim 1, wherein the current shape controller limits a magnitude of a current of the rectified input signal when the magnitude of the current of the rectified input signal exceeds the limiting value.

15. The circuit of claim 1, wherein the current shape controller limits a value of the current shaping signal to a value of the phase angle signal.

16. The circuit of claim 1, wherein the lighting system is a Direct Alternating Current Drive (DACD) light emitting diode (LED) system.

17. A light emitting diode (LED) driver comprising:
a dimmer configured to generate an input signal;
a rectifier configured to generate a rectified input signal by rectifying the input signal;
a phase angle detector configured to detect a phase angle of the rectified input signal and generate a phase angle signal indicative of the phase angle, the phase angle being a conduction angle of the dimmer; and
a current shape controller configured to determine a current shaping signal using the detected phase angle and to adjust the rectified input signal in response to the current shaping signal,
wherein the current shape controller decreases a limiting value of the rectified input signal when the phase angle is decreased.

18. A method for controlling a lighting system, the method comprising:
detecting a phase angle of a rectified input signal to generate a phase angle signal indicative of the detected phase angle;
determining a current shaping signal using the phase angle; and
adjusting the rectified input signal in response to the current shaping signal,
wherein adjusting the waveform of the rectified input signal includes decreasing a limiting value of the rectified input signal when the phase angle is decreased.

19. The method of claim 18, wherein adjusting the waveform of the rectified input signal further includes varying a value of the rectified input signal in a time interval with the phase angle, the time interval corresponding to the phase angle.

20. The method of claim 19, wherein the value of the rectified input signal is increased in the time interval when the phase angle is decreased.

* * * * *